(12) United States Patent
Misra et al.

(10) Patent No.: US 10,750,404 B2
(45) Date of Patent: Aug. 18, 2020

(54) SYSTEMS AND METHODS FOR MOBILE NETWORK GUIDANCE FOR OVER-THE-TOP APPLICATIONS

(71) Applicant: Uhana, Inc., Palo Alto, CA (US)

(72) Inventors: Rakesh Misra, Palo Alto, CA (US);
Manu Sharma, Palo Alto, CA (US);
Rahul Tandra, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 16/506,283

(22) Filed: Jul. 9, 2019

(65) Prior Publication Data

US 2020/0015121 A1 Jan. 9, 2020

Related U.S. Application Data

(60) Provisional application No. 62/695,481, filed on Jul. 9, 2018, provisional application No. 62/797,879, filed on Jan. 28, 2019.

(51) Int. Cl.
*H04W 28/06* (2009.01)
*H04W 28/02* (2009.01)
*H04W 24/02* (2009.01)
*H04L 29/06* (2006.01)

(52) U.S. Cl.
CPC ............ *H04W 28/06* (2013.01); *H04L 65/80* (2013.01); *H04W 24/02* (2013.01); *H04W 28/0231* (2013.01)

(58) Field of Classification Search
CPC ....... H04L 47/25; H04L 47/823; H04L 47/30; H04L 67/02; H04L 65/4069; H04W 24/08; H04W 8/02
See application file for complete search history.

(56) References Cited

U.S. PATENT DOCUMENTS

| 9,743,258 B1* | 8/2017 | Elsherif ............... H04B 17/336 |
| 2013/0065601 A1* | 3/2013 | Song ..................... H04W 28/26 |
| | | 455/452.1 |
| 2013/0268577 A1 | 10/2013 | Oyman |
| 2013/0301415 A1 | 11/2013 | Archer et al. |
| 2015/0223255 A1 | 8/2015 | Lakshmi Narayanan et al. |
| 2016/0014620 A1* | 1/2016 | Narayanan ........... H04W 24/02 |
| | | 370/253 |
| 2016/0234678 A1* | 8/2016 | Baum ................. H04W 12/003 |
| 2017/0244639 A1 | 8/2017 | Szilagyi et al. |
| 2018/0041958 A1 | 2/2018 | Narayanan et al. |
| 2018/0183855 A1 | 6/2018 | Sabella et al. |
| 2018/0278507 A1 | 9/2018 | Sintorn et al. |
| 2019/0132413 A1* | 5/2019 | Don .................... H04L 67/2847 |
| 2019/0138934 A1 | 5/2019 | Prakash et al. |
| 2019/0206090 A1* | 7/2019 | Ray ....................... G06F 12/023 |

OTHER PUBLICATIONS

Jain, Ankur, et al., "Mobile Throughput Guidance Inband Signaling Protocol", IETF Internet Draft, https://www.ietf.org/proceedings/92/slides/slides-92-tsvwg-12.pdf, Sep. 7, 2015.
Mao, Hongzi, et al., "Neural Adaptive Video Streaming with Pensieve", SIGCOMM '17, Aug. 21-25, 2017, Los Angeles, CA, USA.

* cited by examiner

*Primary Examiner* — Benjamin M Thieu
(74) *Attorney, Agent, or Firm* — Clayton, McKay & Bailey, PC

(57) ABSTRACT

Systems and methods for providing mobile network guidance to applications communicating with devices via a mobile network.

20 Claims, 3 Drawing Sheets

SYSTEMS AND METHODS FOR MOBILE NETWORK GUIDANCE FOR OVER-THE-TOP APPLICATIONS

CROSS-REFERENCE TO RELATED APPLICATIONS

This application claims priority to U.S. Provisional Application No. 62/695,481 filed 9 Jul. 2018 and U.S. Provisional Application No. 62/797,879 filed 28 Jan. 2019, which are each incorporated herein in its entirety by this reference.

TECHNICAL FIELD

The disclosure herein generally relates to the mobile networking field, and more specifically to new and useful systems and methods for providing mobile network guidance for applications in the mobile networking field.

BACKGROUND

Over-the-top (OTT) applications are increasingly becoming popular for use in mobile devices, such as smartphones and tablets. An OTT application is any application (app) or service that provides a product over the internet and bypasses traditional distribution channels. These applications are typically related to media and communication, such as streaming music and video, as well as voice calling and messaging services. Over-the-top (OTT) applications are increasingly streaming sophisticated data and media content, such as video, over mobile networks in recent years.

DESCRIPTION OF THE PREFERRED EMBODIMENTS

Figure 1A:
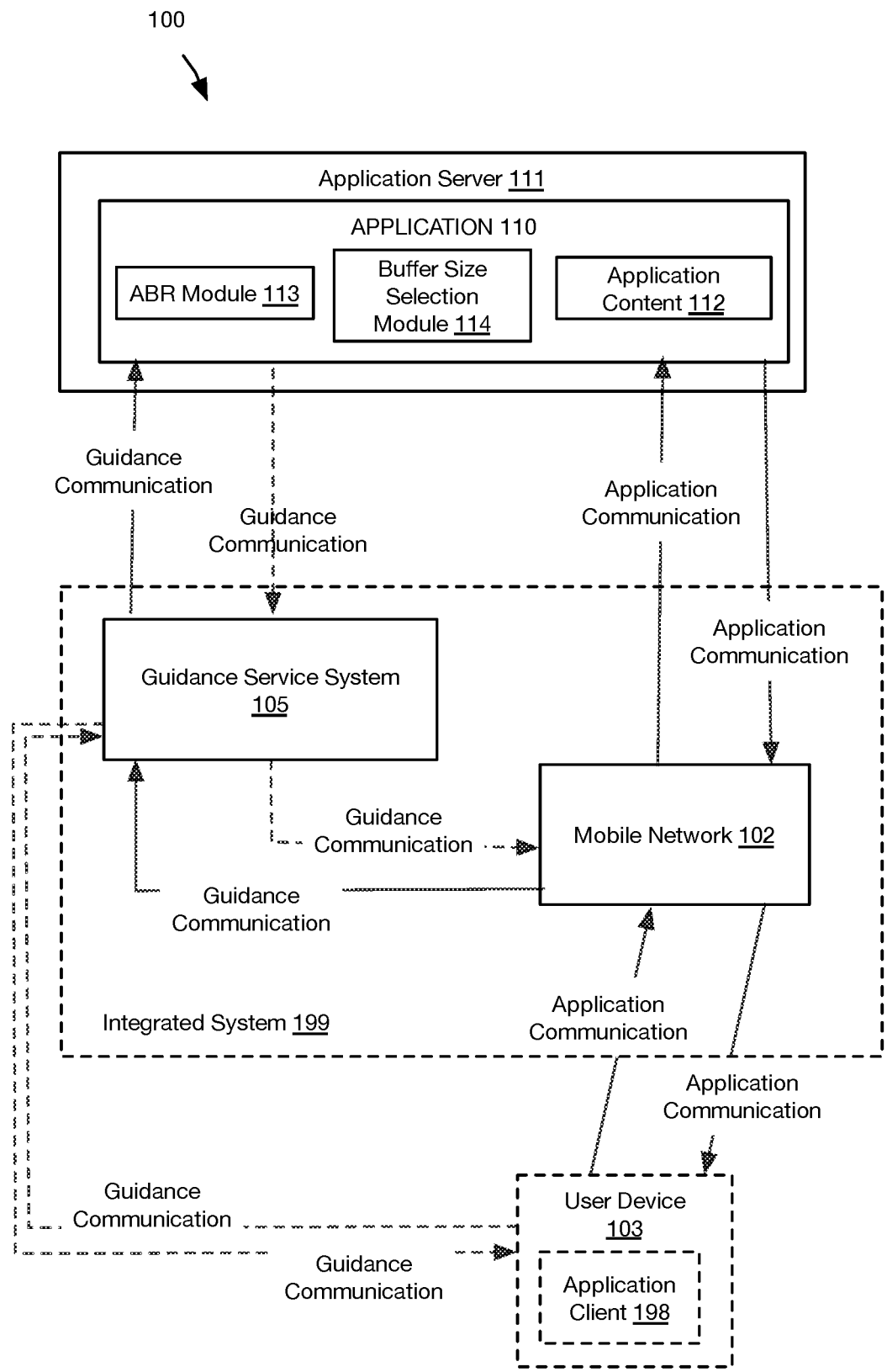
FIGS. 1A-B are schematic representations of a system in accordance with variations.

The following description is not intended to limit the claims, but rather to enable any person skilled in the art to make and use the embodiments disclosed herein.

OTT streaming applications often use adaptation algorithms to adapt the streaming parameters in real time to the conditions of the network. In mobile networks, however, these adaptation algorithms typically result in poor or inconsistent quality of experience (QoE) in terms of streaming content viewing success rate, media quality, viewing interruptions and delays, and more. Further, OTT streaming often leads to a significant amount of wasted (e.g., discarded or abandoned) traffic downloads.

This poor, inconsistent QoE is due to the fact that user throughputs in mobile broadband networks are typically lower on average than other (e.g., wi-fi based) broadband networks, due to lesser available spectrum, higher network contention, and longer (e.g., of inferior quality) wireless links; and higher in variance, often vary rapidly over short time scales such as seconds, due to fluctuations in user signal conditions and/or network congestion. The fluctuations in user signal conditions are typically caused by user mobility or mobility of other reflectors in the environment, while the fluctuations in network congestion are typically caused by the addition of new user sessions or the removal of existing user sessions.

OTT streaming often results in downloads that are not consumed by the end user, and hence must be abandoned. For example, in OTT video streaming, such wasted traffic downloads are due to a combination of user abandonments, chunk abandonments, and chunk replacements. User abandonments occur when a user abandons watching a video midway and the content that has been already downloaded into the video buffer but not yet played back has to be discarded. Chunk abandonments occur when a video application downloads a video segment at a much higher quality than what the user throughput allows, which typically results in abandoning downloading the segment midway to avoid the video buffer from running empty (e.g., to prevent the video playback from stalling) and re-downloading the same segment at a lower quality; thus, the partially-downloaded segment has to be discarded. Chunk replacements occur when a video application downloads a video segment at a much lower quality than what the user throughput allows; some applications then re-download the same segment at a higher quality to provide a better QoE to the user, and thus the previous lower-quality segment has to be discarded. In applications which are transacting latency-sensitive content (e.g., videoconferencing) if the packet reaches the receiving system after its deadline has passed, then the packet is often discarded (which makes the network transaction go to waste).

While all of the above sources for wasted traffic downloads exist to various extents in all networks, they occur much more frequently in mobile networks due to the above-described differences in user throughputs. It is therefore particularly important to optimize for reducing wasted traffic downloads in mobile networks.

Such optimization to increase user QoE and reduce wasted traffic downloads is helpful for both OTT service providers and mobile network operators. For OTT service providers, user QoE directly impacts their ability to engage and satisfy users, and therefore they need better QoE to increase user adoption and lower churn. Further, the volume of traffic influences their content distribution network (CDN) costs, and thus they need to minimize abandoned traffic to reduce their CDN costs and improve profitability. Meanwhile, for mobile network operators, a large fraction of mobile traffic is due to media streaming and particularly video, and therefore they need higher traffic efficiency (e.g., lower abandoned traffic to downloaded traffic ratio) to improve their capacity and ability to serve more user content with the same resources. Further, higher user QoE influences their attractiveness for users who stream a sizeable amount of content on mobile phones and tablets, and therefore they need better user QoE to increase their user adoption and retention.

Current methods of providing OTT application streaming over mobile networks have thus far been unsatisfactory in terms of addressing the issue of QoE. OTT application developers typically build adaptation algorithms for streaming media content, e.g., adaptive bitrate (ABR) algorithms for video streaming, that are agnostic to or do not depend on knowledge of specific aspects of an individual underlying network. The strength of this approach is that the adaptation algorithms can work on any network. However, this often comes at the cost of the OTT application having no access or insight into conditions specific to a particular underlying network that can allow the application to intelligently make better adaptation decisions. In addition, mobile network operators often do not want to expose all information regarding their mobile networks. First, privacy reasons lead to mobile operators often wanting to keep some information secret. Second, scale concerns mean that if the operators must build an infrastructure to ensure the ability to ship an increasingly substantial amount of information as the mobile network demands increase, this may be unduly burdensome on mobile backhaul resources or may be impossible from a technical or financial standpoint. For this reason, if information is exposed to OTT applications in order to improve QoE, then ideally the only information exposed is the minimal amount of information to provide satisfactory QoE for users of the application and reduce wasted traffic downloads.

Thus, there is a need in the mobile networking field to create new and useful methods for providing OTT applications with the information necessary to deliver a good and consistent user QoE for streaming media over mobile networks while minimizing wasted downloads. The disclosure herein provides such new and useful methods.

1. Systems

As shown in FIG. 1A, a system 100 includes at least one of a mobile network (e.g., 102), a guidance service system (e.g., 105), an application (e.g., 110), and at least one user device (e.g., 103). In some implementations, the guidance service system is included in the mobile network. In some implementations, the guidance service system is included in the application server. In some implementations, the guidance service system and the mobile network are included in an integrated system (e.g., 199) operated by the same entity. In some implementations, the guidance service system is external to the mobile network (e.g., operated by an entity that is different from an entity operating the mobile network).

In some implementations, the guidance service system is communicatively coupled to both the mobile network (e.g., 102) and the application server (e.g., 111). In some implementations, the guidance service system is communicatively coupled to at least one user device (e.g., 103).

In some variations, the guidance service system functions to receive guidance communication from the mobile network (e.g., 102) and provide guidance communication to at least one application (e.g., 110) provided by the application server (e.g., 111). In some variations, the guidance service system functions to receive guidance communication from the application. In some variations, the guidance service system functions to provide guidance communication to the mobile network (e.g., 102). In some variations, the guidance service system functions to provide guidance communication for application communication via the mobile network for each of a plurality of user devices. In some variations, the guidance service system functions to provide guidance communication for application communication via the mobile network for each of a plurality of application servers (e.g., 111). In some variations, the guidance service system functions to provide guidance communication for application communication via the mobile network for each of a plurality of user devices (e.g., 103) that include application clients (e.g., 198).

In some variations, guidance communication from the guidance service system (e.g., 105) to an application server (e.g., 111) includes throughput prediction information. In some implementations, a prediction engine (e.g., 160) generates the throughput prediction information. In some variations, throughput prediction information includes at least one of: a future time period associated with the prediction information; a predicted future link throughput change for application communication (between an application server and a user device via a mobile network) relative to a previous time period; and a future link throughput quality description of a predicted quality of link throughput for the application communication. In some variations, throughput prediction information includes at least one of: a future time period associated with the prediction information; a predicted future average application throughput for the application communication; and a predicted future worst-case application throughput for the application communication.

In some implementations, a predicted future link throughput change identifies a maximum predicted drop in throughput during a future time period. In some implementations, a confidence level is provided with the predicted future link throughput change that indicates the likelihood that the drop in throughput is less than the maximum predicted drop. In some implementations, the confidence level is configured by the application, such that the guidance server system provides a prediction for the configured confidence level. In some implementations, a future link throughput quality description of the predicted quality is a qualitative value (e.g., poor, fair, good, very good, excellent). In some implementations, a confidence level is provided with the predicted future link throughput quality description that indicates the likelihood that the quality is equal to or better than the described quality. In some implementations, the confidence level is configured by the application, such that the guidance server system provides a predicted throughput quality description for the configured confidence level. In some implementations, the predictions for throughput change and throughput quality description are provided for a same confidence level. In some implementations, a predicted future worst-case application throughput identifies a worst-case throughput during a future time period. In some implementations, a confidence level is provided with the predicted worst-case throughput that indicates the likelihood that actual throughput is greater than the worst-case throughput. In some implementations, the confidence level is configured by the application, such that the guidance server system provides a prediction of the worst-case throughput for the configured confidence level.

In some variations, guidance communication from the guidance service system to an application server includes latency prediction information. In some implementations, the prediction engine (e.g., 160) generates the latency prediction information. In some variations, latency prediction information includes at least one of: a future time period associated with the prediction information; a predicted future link latency change for application communication (between an application server and a user device via a mobile network) relative to a previous time period; and a future link latency quality description of a predicted quality of link latency for the application communication. In some variations, latency prediction information includes at least one of: a future time period associated with the prediction information; a predicted future average application latency for the application communication; and a predicted future worst-case application latency for the application communication.

In some implementations, a predicted future link latency change identifies a maximum predicted increase in latency during a future time period. In some implementations, a confidence level is provided with the predicted future link latency change that indicates the likelihood that the increase in latency is less than the maximum predicted increase. In some implementations, the confidence level is configured by the application, such that the guidance server system provides a prediction for the configured confidence level. In some implementations, a future link latency quality description of the predicted quality is a qualitative value (e.g., poor, fair, good, very good, excellent). In some implementations, a confidence level is provided with the predicted future link latency quality description that indicates the likelihood that the quality is equal to or better than the described quality. In some implementations, the confidence level is configured by the application, such that the guidance server system provides a predicted latency quality description for the configured confidence level. In some implementations, the predictions for latency change and latency quality description are provided for a same confidence level. In some implementations, a predicted future worst-case application latency identifies a worst-case latency during a future time period. In some implementations, a confidence level is provided with the predicted worst-case latency that indicates the likelihood that actual latency is lower than the worst-case latency. In some implementations, the confidence level is configured by the application, such that the guidance server system provides a prediction of the worst-case latency for the configured confidence level.

In some variations, guidance communication from the guidance service system to a mobile network includes throughput prediction information.

In some variations, guidance communication from the guidance service system to a mobile network includes latency prediction information.

In some variations, guidance communication from an application server to the guidance service system includes at least one of throughput feedback information and application feedback information. In some variations, throughput feedback information includes information identifying measured application throughput for a corresponding predicted average application throughput. In some implementations, application feedback information includes at least one of: a bit rate determined based on the predicted average application throughput, a maximum buffer size selected based on the predicted worst-case application throughput associated with the predicted average application throughput, QoE (Quality of Experience) information (e.g., download time), and traffic efficiency information.

In some variations, guidance communication from the guidance service system to a application client (e.g., 198) executed by a user device includes throughput prediction information.

In some variations, guidance communication from the guidance service system to a application client (e.g., 198) executed by a user device includes latency prediction information.

In some variations, guidance communication from an application client (e.g., 198) to the guidance service system includes at least one of throughput feedback information and application feedback information.

In some variations, the user device is operated by a human user. In some embodiments, the user device is an autonomous device (e.g., an autonomous vehicle, an IoT device, a robot, a drone, an aircraft, a spacecraft, a mobile data processing system, etc.).

In some variations, the application server (e.g., 111) provides application communication to a user device (e.g., 103) via a mobile network (e.g., 102). In some variations, application communication provided from the application server to the user device includes application content (e.g., 112). In some implementations, application content includes at least one of video content, audio content, image content, textual content, raw data, telemetry data, sensor measurements, control parameters, and the like.

In some implementations, the application client (e.g., 198) is a client that executes on a user device (e.g., 103) and that functions to interact with the application (e.g., 110) executed by the application server (e.g., 111) to provide a service via the user device.

In some implementations, the application (e.g., 110) is an over-the-top (OTT) application. In some implementations, the application server (e.g., 111) is a server of an over-the-top (OTT) content delivery platform. In some implementations, the OTT application is an application that is sensitive to the mobile network (e.g., sensitive to network throughput and/or latency). In some implementations, the application is an OTT video application.

In some implementations, the application is a downlink multimedia streaming application (e.g., an application for video streaming, music/audio streaming, Augmented Reality/Virtual Reality streaming, video conferencing, online gaming, online collaboration). In some implementations, online collaboration applications include screen sharing applications. In some implementations, the application is an upload bandwidth sensitive application (e.g., an application for sensor data upload, an application for cloud inference). In some implementations, a sensor data upload application includes a dash camera streaming application. In some implementations, the application is an autonomous vehicle (e.g., an application for cars, drone) application (e.g., an application for tele-operation, platooning, cooperative maneuvers, collaborative sensing). In some implementations, collaborative maneuvers include, for example, vehicle overtaking (passing), lane changes, etc.). In some implementations, collaborative sensing includes, for example, exchanging sensor data from camera/LIDAR between vehicles in mission-critical scenarios like crash avoidance.

In some implementations, the application (e.g., 110) is an immersive multimedia application. In some implementations, the application (e.g., 110) is an interactive multimedia application. In some implementations, the application (e.g., 110) is an Augmented Reality application. In some implementations, the application (e.g., 110) is a Virtual Reality application. In some implementations, the application (e.g., 110) is a video game.

In some implementations, the application (e.g., 110) is a video conferencing application. In some implementations, the application (e.g., 110) is a video streaming application. In some implementations, the application (e.g., 110) is a real-time control application (e.g., vehicle control, mission critical system control, robot control, etc.).

In some implementations, the application (e.g., 110) is a vehicle control application. In some implementations, the application (e.g., 110) is a data processing application. In some implementations, the application (e.g., 110) is a machine learning application. In some implementations, the application (e.g., 110) is an artificial intelligence application. In some implementations, the application (e.g., 110) is a video streaming application.

In some implementations, the application (e.g., 110) includes an ABR (Adaptive Bitrate) module (e.g., 113) that is constructed to determine a bit rate for a next application content transmission, based on prediction information received from the guidance service system (e.g., 105). In some implementations, the ABR module (e.g., 113) is constructed to determine the bit rate for the next application content transmission, based on at least one of: a future link throughput quality prediction, a future average application throughput prediction, a future link latency quality prediction, and a future average application latency prediction, received from the guidance service system (e.g., 105). In some implementations, the application (e.g., 110) includes a buffer size selection module (e.g., 114) that is constructed to determine a maximum buffer size for a next application content transmission, based on prediction information received from the guidance service system (e.g., 105). In some implementations, the buffer size selection module is constructed to determine the maximum buffer size based on at least one of: a future link throughput change prediction, a future worst-case application throughput prediction, a future link latency change prediction, and a future worst-case application latency prediction, received from the guidance service system (e.g., 105).

By selecting a maximum buffer size based on prediction information, network efficiency of the mobile network (e.g., 102) can be improved. In some implementations, the user device buffers application content in a buffer to improve QoE by reducing negative impact of drops in throughput or increases in latency. For example, a buffer can be used to pre-store content so that content playback does not freeze if latency increases or throughput decreases. In many cases, a large buffer size at the user device will account for large drops in throughput or increases in latency. However, a large buffer size can reduce network efficiency if chunk abandonment or chunk replacement occurs. By providing the application with prediction information (as described herein), the application can limit the buffer size (and corresponding application content transmitted to the user device to populate the buffer at the user device) to a size that will account for predicted future changes (or worst-case values) in throughput and/or latency. For example, without such prediction information, a conservative application might select a buffer-size to account for a worst-case throughput of 0.5 Mbps (even if average throughput is 2 Mbps), whereas in reality, there is a 99% likelihood that the worst-case throughput is greater than 1.5 Mbps. In such a case, the selected buffer size would be too large, and result in unnecessary inefficiency during a chunk abandonment or chunk replacement. However, if the application is provided with prediction information informing the application that there is a 99% likelihood that the worst-case throughput is 1.5 Mbps, then the application can select a smaller buffer size, thereby reducing the network efficiency impact during a chunk abandonment or chunk replacement. Similarly, if the application is provided with prediction information informing the application that there is a 99% likelihood that the worst-case throughput drop is a one-third (⅓) drop, then the application can select a smaller buffer size, thereby reducing the network efficiency impact during a chunk abandonment or chunk replacement. In this manner, selecting a maximum buffer size based on prediction information can improve network efficiency of the mobile network (e.g., 102).

Moreover, if the application is provided with prediction information informing the application that there is a 99% likelihood that the worst-case latency is 100 ms (rather than a previously estimated 20 ms), then the application can perform a process locally rather than by using a remote system. For example, an application that ordinarily uses a remote cloud-based inference system (e.g., that uses machine learning to generate a result) can perform an inference process locally (so as to get a real-time result) in a case where latency is worse than expected. As an example, a traffic signal inference application on an autonomous vehicle can perform traffic signal inference locally in a case where predicted network latency is worse than expected.

Similarly, if the application is provided with prediction information informing the application that there is a 99% likelihood that the worst-case latency increase is 25 ms, then the application can perform the process at the remote system, rather than locally. In this manner, the application can use the prediction information to determine whether to perform a process locally or remotely (e.g., in the cloud) via a network connection.

In some implementations, the application client (e.g., 198) includes a buffer parameter selection module that is constructed to determine buffer parameters for a next application content transmission, based on prediction information received from the guidance service system (e.g., 105). In some implementations, the buffer parameter selection module is constructed to determine the buffer parameters based on at least one of: a future link throughput change prediction, a future worst-case application throughput prediction, a future link latency change prediction, and a future worst-case application latency prediction, received from the guidance service system (e.g., 105).

In some variations, application communication from a mobile network to an application server includes user input (e.g., requests, instructions, commands, content, etc.) received from a user device (e.g., 103) and intended for an application server (e.g., 111) that provides content (e.g., 112) of an application (e.g., 112) to the user device (e.g., 103) via the mobile network (e.g., 102). In some variations, application communication from a user device to a mobile network includes user input (e.g., requests, instructions, commands, content, etc.).

In some variations, the application server (e.g., 111) is implemented by one or more computing servers having at least one computer processor (e.g., graphics processor units (GPU), tensor processing unit (TPU), central processing units (CPUs, MCUs, etc.)), at least one processor-readable storage medium, and at least one network device. In some implementations, the network device of the application server is communicatively coupled to one or more of a network device of the guidance service system (e.g., 105), the mobile network (e.g., 102) and a user device (e.g., 103) (either directly, or indirectly via one or more other systems) via a network (e.g., a private network, a public network, the Internet, etc.). In some implementations, at least one storage medium is one of (or a combination of two or more of) a hard drive, a flash drive, a DVD, a CD, an optical disk, a floppy disk, a flash storage, a solid state drive, a ROM, an EEPROM, an electronic circuit, a semiconductor memory device, and the like. In some implementations, at least one storage medium includes machine-executable instructions, that when executed by a processor of the application server, control the application server to perform at least one process of the methods described herein. In some implementations, at least one storage medium includes machine-executable instructions (and/or data) for at least one application (e.g., 110). In some implementations, at least one storage medium includes machine-executable instructions (and/or data) for at least one of an ABR module (e.g., 113) and a buffer size selection module (e.g., 114) for least one application (e.g., 110). In some implementations, at least one storage medium includes application content (e.g., 112) for least one application (e.g., 110).

In some variations, guidance communication from a mobile network (e.g., 102) to the guidance service system (e.g., 105) includes: telemetry data for the mobile network. In some implementations, telemetry data includes telemetry data of a plurality of infrastructure elements of the mobile network (e.g., 102). In some implementations, telemetry data includes telemetry data of a plurality of base stations. In some implementations, telemetry data includes telemetry data of a plurality of eNodeBs. In some implementations, telemetry data includes telemetry data of a plurality of radio communication antennas. In some implementations, telemetry data includes telemetry data identifying a number of user sessions of each of a plurality of neighboring base stations at several points in time. In some implementations, telemetry data includes telemetry data identifying bandwidth usage of each of a plurality of neighboring base stations. In some implementations, telemetry data includes at least one of: a timestamp of when an event occurred in the network; a threshold relating to at least one of data bandwidth, download speed, call failure, or other aspect of the network that has been exceeded, and at what time); the frequency of calls being dropped for VoiceIP data; the location of cell towers within the mobile network; customer complaints received, in which areas, and at what frequency; and any other data relating to the network and telemetry. In some variations, the telemetry data includes UE polling responses. In some variations, the telemetry data includes at least one of a performance KPI and a network KPI. In some variations, the telemetry data includes network trace data generated by at least one infrastructure element of the mobile network. In some variations, the telemetry data includes network trace data generated by each base station of the mobile network. In some variations, the telemetry data includes session handoff information for at least one base station of the mobile network. In some implementations, the session handoff information for a base station identifies at least one other base station to which the base station hands of a mobile communication session. In some variations, the telemetry data includes time-frequency characteristic data for at least one base station receive antenna.

In some variations, the guidance service system (e.g., 105) is an on-premises system included in the mobile network (e.g., 102). In some variations, the guidance service system is a cloud-based system coupled to the mobile network via the Internet. In some variations, the guidance service system is a single tenant system. In some variations, the guidance service system is a multi-tenant system that provides guidance communication to a plurality of applications (e.g., 110). In some variations, the guidance service system is a multi-tenant system that receives guidance communication for a plurality of mobile networks (e.g., 102). For example, several applications (e.g., managed by a same entity or different entities) can each register a platform account at the guidance service system, enable guidance for one or more mobile network providers, and receive guidance information for use in improving user Quality of Experience for the application. In some variations, the guidance service system is coupled to at least one application server (e.g., 110) via the Internet.

In some variations, the guidance service system (e.g., 105) is implemented by one or more computing servers having at least one computer processor (e.g., graphics processor units (GPU), tensor processing unit (TPU), central processing units (CPUs, MCUs, etc.)), at least one processor-readable storage medium, and at least one network device. In some implementations, the network device of the guidance service system is communicatively coupled to one or more of a network device of a the application server (e.g., 111), the mobile network (e.g., 102) and a user device (e.g., 103) (either directly, or indirectly via one or more other systems) via a network (e.g., a private network, a public network, the Internet, etc.). In some implementations, at least one storage medium is one of (or a combination of two or more of) a hard drive, a flash drive, a DVD, a CD, an optical disk, a floppy disk, a flash storage, a solid state drive, a ROM, an EEPROM, an electronic circuit, a semiconductor memory device, and the like. In some implementations, at least one storage medium includes machine-executable instructions, that when executed by a processor of the guidance service system, control the guidance service system to perform at least one process of the methods described herein.

Figure 1B:
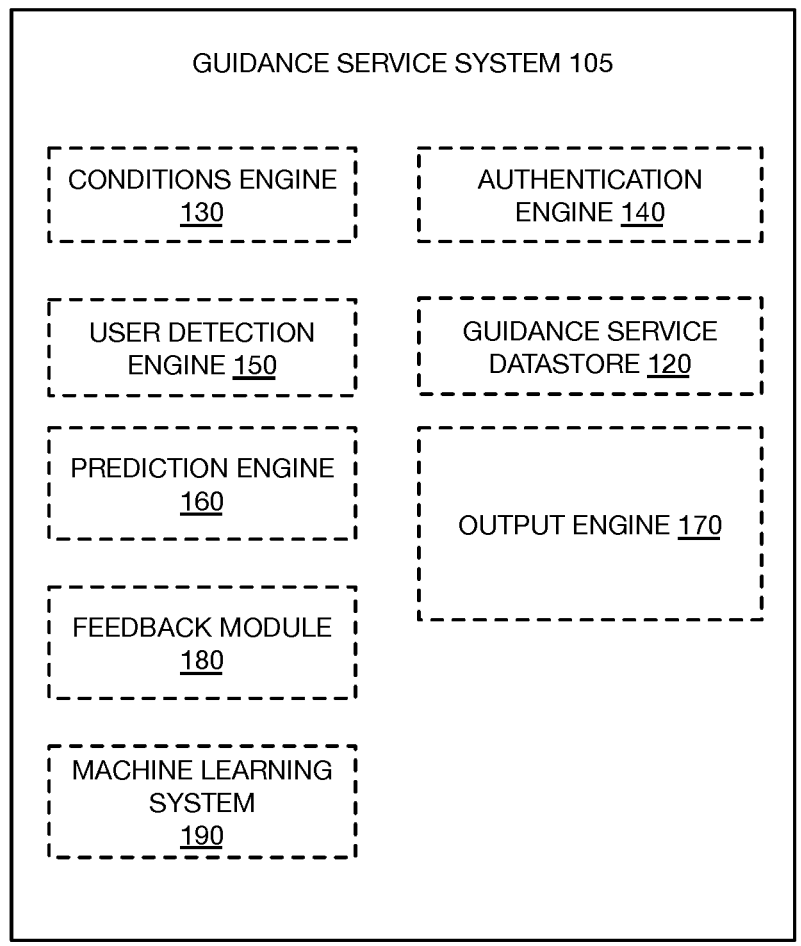

In some implementations, at least one storage medium includes machine-executable instructions (and/or data) for one or more of: a guidance service datastore 120, a conditions engine 130, an authentication engine 140, a user detection engine 150, a prediction engine 160, an output engine 170, a feedback module 180, and a machine learning system 190, as shown in FIG. 1B In some variations, the guidance system includes one or more of a guidance service datastore 120, a conditions engine 130, an authentication engine 140, a user detection engine 150, a prediction engine 160, an output engine 170, a feedback module 180, and a machine learning system 190, as shown in FIG. 1B.

The guidance service platform 105 may be implemented by a mobile networking service, network monitoring and/or control service, mobile network operator, internet service provider, OTT application, or any other network service or entity. In some variations, one or more aspects of the system may be enabled by a web-based software platform (e.g., the guidance service) operable on a mobile cloud network.

In some variations, the system 100 functions to provide a guidance service related to user QoE at a mobile network. An application (e.g., 110), such as a video streaming application, is authenticated as operating within the mobile network, and one or more active users are detected as using the application. In response to the detection of active users, the guidance service determines per-user throughput and (additionally or alternatively) latency predictions in real time for the application, and provides the predictions (or derivative metrics thereof) to the application.

The mobile network 102 includes a plurality of cells or base stations, and can be a cellular network, wireless network, wireless spectrum network, or any other network maintained by a mobile network provider. In some variations, the mobile network operator is a streaming media provider, internet service provider, vendor, or other entity associated with a network. In some variations, the mobile network hosts the guidance service system 105. In some variations, the application operates over the mobile network 102.

In some variations, the guidance service datastore 120 includes at least one of telemetry data received from the mobile network 102, prediction information generated by the guidance service system 105, and feedback received from at least one application (e.g., 110).

In some variations, the guidance service datastore 120 includes one or more databases in which data collected, received, extracted, and/or generated by the application, guidance service, and/or mobile network 102 are stored. In some variations, the guidance service datastore 120 stores network condition data, application data, user throughput data (e.g., history, time series, etc.), throughput data per cell or base station, mobile network latency data, authentication data, user throughput predictions, user latency predictions, video bitrate levels, data bitrate levels, maximum buffer levels, and/or any other suitable application configuration data.

In some variations, the guidance service system 105 is a platform for a guidance service related to a mobile network. In a first implementation, the guidance service system 105 is hosted in part or in whole on the mobile network 102 or the mobile network provider's computing systems. In a second implementation, the guidance service system 105 interfaces with the mobile network 102 or the mobile network provider to receive per-user, per-cell, or per-base station data, and to provide network analytics or metrics to the application (or application server, e.g., 111) (e.g., sits as an auxiliary layer between the mobile network provider and the application server). In some implementations, the guidance service system provides an Application Program Interface (API) that is exposed to one or more mobile network operators and/or one or more application servers. In some variations, the guidance service API is a narrow mobile network guidance API adapted specifically for OTT applications, such as video content streaming, video conferencing, online gaming, augmented reality (AR) streaming, virtual reality (VR) streaming, screen sharing, live surveillance, and/or any other suitable OTT application. In some implementations, the guidance service system (e.g., 105) includes one or more components for using the guidance service API to send and receive network-related data and information between a mobile network 102 and an OTT application 110 and/or a mobile device running the OTT application 110. In some variations, the guidance service system (e.g., 105) includes one or more sets of rules or heuristics relating to the mobile network 102. However, the guidance service system 105 can include any other suitable metric- or prediction-generation methods.

In some variations, the conditions engine 130 functions to receive information about a number of network conditions from the mobile network 102. In some variations, the conditions engine 130 functions to access telemetry data of at least one mobile network (e.g., 102). In some variations, the information is sent from the mobile network 102 to be stored in the guidance service datastore 120, and then the conditions engine 130 retrieves the information from the guidance service datastore 120. In some variations, the information is sent from the OTT application 110 in the form of OTT data. In some variations, the information about network conditions includes a set of fine-grained, contextual information about each user (e.g., each individual device, each unique user or device identifier, each user account, etc.), and/or each cell in the network. In some variations, the information includes user activity relating to the OTT application 110, active users of the OTT application, inactive users of the OTT application, total number of past and current users of the OTT application, per-user throughputs for the OTT application over one or more recently completed segment downloads, bitrate levels selected by the application, maximum buffer levels selected by the application, quality of experience metrics (QoE metrics) (e.g., for the selected bitrate level), traffic efficiency (e.g., for the selected maximum buffer level), latency of the mobile network, timestamps relating to various events of the mobile network, information about one or more ABR algorithms employed within the OTT application, and/or any other suitable feedback. The feedback can be used by the guidance service system (e.g., 105) to refine any predictions (e.g., throughput predictions; average throughput predictions; worst case throughput predictions; latency predictions; average latency predictions; worst case latency predictions; recommended bitrate levels; recommended maximum buffer levels; etc.), or otherwise used.

In some variations, the authentication engine 140 functions to authenticate, at the guidance service system, the application (e.g., 110), which provides application communication to at least one user device (e.g., 103) via the mobile network 102. In some variations, authentication includes Open Authentication (oAuth) or some other web-based form or standard for authenticating users, entities, or applications.

In some variations, authentication includes verifying that the application has permission to operate within and receive network condition data from the mobile network 102 and/or has permission to access and communicate with the guidance service platform 105 (e.g., based on valid access tokens, etc.). In some variations, one or more security checks are performed on the application 110.

In some variations, the user detection engine 150 functions to detect, at the guidance service system 105, one or more active users of the application 110. Active users include users who are currently and actively, at that given moment of time during the detection process, using the application 110 in some way. In some variations, active use includes a mobile device associated with the user streaming a video or other piece of media via the application 110. In some implementations, the user detection engine 150 monitors application communication received (e.g., via the Internet) from an application server (e.g., 111) that is authenticated by the guidance service system, and identifies a mobile network user session to which the received application communication is routed. In some implementations, the user session is a wireless communication session between an infrastructure element of the mobile network (e.g., a base station, eNodeB, etc.) and a user device (e.g., 103). In some implementations, the user detection engine 150 identifies a user of the mobile network user session as an active user of the application (e.g., 110) based on the content of the monitored application communication. For example, in a case where the user detection engine 150 detects transmission of content from the application server (e.g., 111) to the user device (e.g., 103) via the mobile network (e.g., 102), then the user detection engine 150 identifies the user of the corresponding mobile network user session as an active user.

The machine learning system 190 functions to perform at least one of: generating labeled training data; and training at least one machine learning model. The machine learning system 190 can include one or more of a local machine learning system (e.g., implemented in Python, R, etc.), a cloud-based machine learning client (e.g., an application communicatively coupled to a cloud-based machine learning system such as, for example, Microsoft Azure Machine Learning Service™, and the like), or any other suitable type of machine learning system. In some implementations, the machine learning system 190 functions to train and/or generate at least one component of at least one of the prediction engine 160 and the feedback module 180. In some implementations, at least one of the machine learning system 190, the prediction engine 160, and the feedback module 180 includes a component (e.g., a module, a model, etc.) that functions to perform one or more of: supervised learning (e.g., using logistic regression, back propagation neural networks, random forests, decision trees, etc.), unsupervised learning (e.g., using an Apriori algorithm, k-means clustering, etc.), semi-supervised learning, reinforcement learning (e.g., using a Q-learning algorithm, temporal difference learning, etc.), and any other suitable learning style.

In some implementations, at least one of the machine learning system 190, the prediction engine 160, and the feedback module 180 implements any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminant analysis, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolutional network method, a stacked auto-encoder method, etc.), a dimensionality reduction method (e.g., principal component analysis, partial test squares regression, Sammon mapping, multidimensional scaling, projection pursuit, etc.), an ensemble method (e.g., boosting, boostrapped aggregation, AdaBoost, stacked generalization, gradient boosting machine method, random forest method, etc.), and any suitable form of machine learning algorithm. At least one processing portion of the guidance service system 105 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the guidance service system 105.

In some variations, the prediction engine 160 functions to generate prediction information (as described herein). In some implementations, a prediction engine (e.g., 160) generates throughput prediction information (as described herein). In some implementations, the prediction engine (e.g., 160) generates throughput prediction information for one of more future time periods (e.g., time periods corresponding to the next one or more application content downloads).

In some implementations, a prediction engine (e.g., 160) generates latency prediction information (as described herein). In some implementations, a prediction engine (e.g., 160) generates latency prediction information for one of more future time periods (e.g., time periods corresponding to the next one or more application content downloads).

In some variations, the prediction engine 160 generates prediction information from telemetry data received from the mobile network 102. In some implementations, the telemetry data includes telemetry data for multiple base stations, and optionally multiple users. By virtue of using data for multiple base stations, and optionally multiple users to generate prediction information, the prediction engine can provide improved predictions, as opposed to systems that generate predictions using telemetry data of a single base station, and/or a single user session. By virtue of using data for multiple base stations, and optionally multiple users to generate prediction information, the prediction engine can provide improved predictions, as opposed to systems that generate predictions using network data and/or user session data captured by a user device.

In some variations, the prediction engine 160 generates prediction information from received feedback information received from at least one application (e.g., 110). In some variations, the prediction engine 160 generates prediction information from data stored in the datastore 120.

In some implementations, each prediction generated by the prediction engine (e.g., 160) is associated with confidence level. In some implementations, the prediction engine generates the confidence level for each prediction. In some implementations, the confidence level is a configured (or predetermined) value, and the prediction engine generates each prediction for the confidence level. In some implementations, the predetermined confidence level is one of: global and static, determined by the application receiving the information (e.g., requesting the information), dynamically adjusted based on real-time application feedback or mobile network operation parameters (e.g., current throughput, etc.); however, the confidence level can be otherwise determined. In some variations, the average and worst-case user throughput (or latency) predictions in combination are enough to improve user QoE by altering one or more ABR algorithms and (alternatively or additionally) selecting a maximum buffer size for application content downloads at the user device. In some variations, the predictions are per-user predictions, such that a prediction is generated for each user (or active user) using the application in some way. In some variations, the prediction engine 160 determines the predictions in real time or substantially real time, meaning that the mobile network and/or the guidance service system are set up to provide predictions over time scales of a fraction of a second to a few seconds, which is much faster and more accurate than if the application were to predict or determine user throughput and/or latency by itself. In other variations, the prediction engine 160 determines the predictions at a predetermined frequency, for a given epoch (e.g., predetermined period of time), next N content segment downloads (e.g., wherein N can be predetermined, determined by the application requesting the information, or otherwise determined), or at any suitable frequency.

In some implementations, the prediction engine (e.g., 160) is constructed to predict a next base station (cell tower) to which a current user session (between the user device and the mobile network) connect (e.g., a handoff), and use telemetry data of the next base station to generate at least one of throughput prediction information and latency prediction information based on the telemetry data of the next base station. For example, if the user session is transferred to a base station having a higher number of user sessions than the current base station, then throughput (and/or latency) for the user session might worsen. In some implementations, the prediction engine (e.g., 160) is constructed to predict one or more user sessions that are likely to be transferred to a base station being used for an instant user session (whose predictions are being determined), and use user session information (e.g., bandwidth usage) of the transferring user sessions to generate at least one of throughput prediction information and latency prediction information for the instant user session. For example, if a mass of users streaming content (e.g., video content) are transferred to the base station being used by the instant user session, then throughput (and/or latency) for the instant user session might worsen.

By virtue of the prediction engine (e.g., 160) accessing information identifying what is happening in the mobile network (e.g., handoffs, bandwidth used by user sessions, user session information for neighboring base stations, etc.), the prediction engine can make improved throughput and/or latency predictions that are informed by observed (or predicted) changes in the network.

In some variations, the output engine 170 functions to provide, from the guidance service system (e.g., 105) to the application, per-user prediction information. In some implementations, the output engine provides predictions information in real time or substantially real time (e.g., over time scales of a fraction of a second to a few seconds), at a predetermined frequency, or at any other suitable time. In some implementations, the output engine provides predictions via an API of the output engine. In some implementations, the API is a REST API. In some implementations, the output engine provides predictions information to a callback configured for the application (e.g., 110). In some implementations, the output engine provides prediction information via a graphical user interface (GUI) of the output engine. In some implementations, the output engine provides prediction information to one or more application servers of the application and/or user devices of the application. In some implementations, the output engine includes an API module that processes API requests and provides responses to processed API requests. In some implementations, the output engine includes an application server that provides a graphical user interface to at least one external device (e.g., the application server 111).

In some variations, the guidance service system (e.g., 105) provides prediction information in one of three modes: 1) open-loop guidance, 2) application-agnostic closed-loop guidance, and 3) application-aware closed-loop guidance.

In some implementations, in the open-loop guidance mode for throughput, the guidance service system (e.g., 105) provides to the application: a description of predicted future link throughput quality and a predicted future link throughout change (e.g., throughput drop).

In some implementations, in a close-loop guidance mode (application agnostic or application aware) for throughput, the guidance service system (e.g., 105) provides to the application: a predicted future average application throughput and a predicted future worst case application throughput.

In some implementations, in an application-agnostic close-loop guidance mode for throughput: the guidance service system (e.g., 105) receives from the application: throughput feedback information. In some implementations, the received throughput feedback information identifies application throughput measured by the application (e.g., 110) for a corresponding predicted average application throughput (that was provided to the application by the guidance service system).

In some implementations, in an application-aware close-loop guidance mode for throughput: the guidance service system (e.g., 105) receives from the application: throughput feedback information.

In some implementations, in an application-aware close-loop guidance mode for throughput: the guidance service system (e.g., 105) receives from the application: application feedback information. In some implementations, the received application feedback information corresponds to a predicted average application throughput (that was provided to the application by the guidance service system). In some implementations, the received application feedback information identifies at least one of: a bit rate determined based on the predicted average application throughput, a maximum buffer size selected based on the predicted worst-case application throughput associated with the predicted average application throughput, QoE (Quality of Experience) information (e.g., download time), and traffic efficiency information.

In some implementations, in the open-loop guidance mode for latency, the guidance service system (e.g., 105) provides to the application: a description of predicted future link latency quality and a predicted future link latency change (e.g., throughput increase).

In some implementations, in a close-loop guidance mode (application agnostic or application aware) for latency, the guidance service system (e.g., 105) provides to the application: a predicted future average application latency and a predicted future worst case application latency.

In some implementations, in an application-agnostic close-loop guidance mode for latency: the guidance service system (e.g., 105) receives from the application: latency feedback information. In some implementations, the received latency feedback information identifies application latency measured by the application (e.g., 110) for a corresponding predicted average application latency (that was provided to the application by the guidance service system).

In some implementations, in an application-aware close-loop guidance mode for latency: the guidance service system (e.g., 105) receives from the application: latency feedback information.

In some implementations, in an application-aware close-loop guidance mode for latency: the guidance service system (e.g., 105) receives from the application: application feedback information (as described herein).

In some variations, the feedback module 180 functions to update the prediction engine based on feedback received from the application (e.g., 110). In some variations, the feedback module 180 functions to update the prediction engine (e.g., 160) based at least one of received throughput feedback information and application feedback information. In some variations, updating the prediction engine includes automatically tuning the prediction engine. In some variations, updating the prediction engine includes: updating a tuning parameter of the prediction engine that changes prediction generation by the prediction engine. In some implementations, the tuning parameter is a weight of a machine learning model used by the prediction engine. In some variations, updating the prediction engine includes: adding (or updating) an output transformation used by the prediction engine to transform predictions. In some implementations, the transformation includes a scaling transformation that scales each output of the prediciton engine by a scaling factor. In some implementations, the transformation includes a translation transformation that adds a translation value (e.g., a number) to each output of the prediction engine by a scaling factor. In some implementations, the transformation includes a scaling transformation that applies a scaling function to each output of the prediction engine (wherein each output can be scaled a same or a different manner). In some implementations, the transformation includes a translation transformation that applies a translation function to each output of the prediction engine (wherein each output can be translated in a same or different manner).

2. Methods

Figure 2:
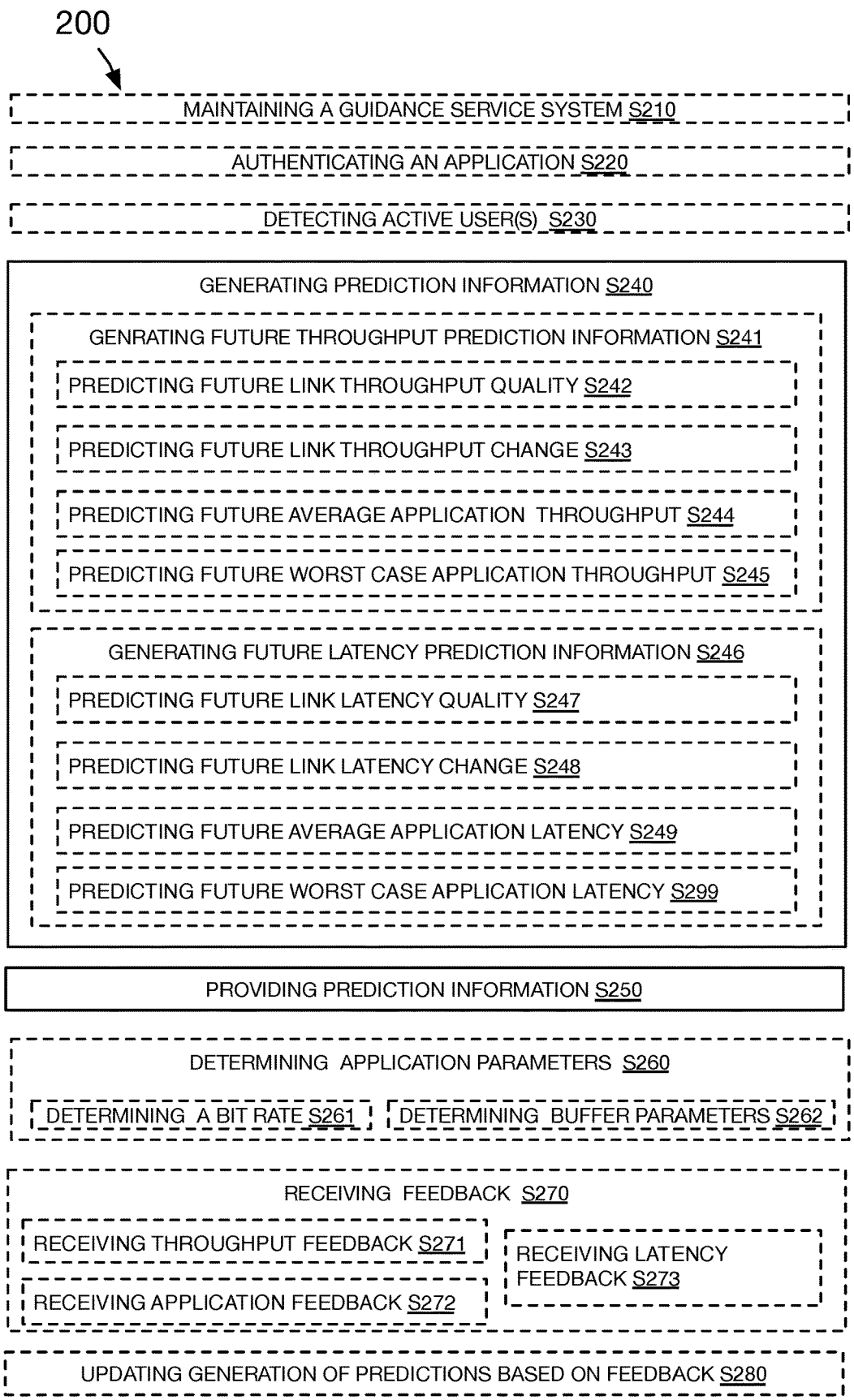
FIG. 2 is a schematic representation of a method in accordance with variations.

As shown in FIG. 2, a method 200 includes at least one of: maintaining a guidance service system S210; authenticating an application S220; detecting active users S230; generating prediction information S240; providing prediction information S250; determining application parameters S260; receiving feedback S270; and updating generation of predictions based on received feedback S280.

In some variations, at least one of the processes of the method 200 is performed by a guidance service system (e.g., 105). In some variations, at least one of the processes of the method 200 is performed by an application (e.g., 110) executed by an application server (e.g., in). In some variations, at least one of the processes of the method 200 is performed by an application client (e.g., 198) executed by a user device (e.g., 103).

In some variations, the method 200 functions to provide throughput and/or latency related guidance to OTT applications operating over a mobile network, to improve QoE and/or reduce wasteful downloads.

In some variations, S210 includes the guidance service system maintaining a guidance service platform for at least one mobile network. In some variations, the guidance service system receives information about a number of network conditions from at least one mobile network, as described above with respect to conditions engine 130.

S220 optionally includes authenticating (as described above with respect to the authentication engine 140) at the guidance service system, an application (e.g., 110) that provides application communication to a user device via a mobile network for which the guidance service system provides guidance.

S230 optionally includes detecting one or more active users of the application, as described above with respect to the user detection engine 150.

S240 includes generating prediction information (as described herein). In some variations, the guidance service system performs S240. In some variations, the prediction engine performs S240. In some variations, the prediction information is per-user session prediction information. In some implementations, the prediction information includes prediction information for application communication between a user device (e.g., 103) and an application server (e.g., 111) via a mobile network (e.g., 102), and for, for each of a plurality of future time periods. In some implementations, for each of the plurality of time periods, the prediction information identifies the future time period.

In some variations, S240 is performed responsive to detection of at least one change affecting network throughput of the mobile network (e.g., 102). In some variations, S240 is performed responsive to detection of at least one change affecting network latency of the mobile network (e.g., 102). In some variations, the guidance service system detects at least one of a change affecting network throughput of the mobile network, and a change affecting network latency of the mobile network.

In some variations, S240 includes one or more of: generating future throughput prediction information S241; and generating future latency prediction information S246.

In some variations, S241 includes one or more of: predicting future link throughput quality S242; predicting future link throughput change S243; predicting future average application throughput S244; and predicting future worst case application throughput S245. In some variations, in an open-loop guidance mode, S241 includes S242 and S243. In some variations, in a closed-loop guidance mode, S241 includes S244 and S245.

In some variations, each future throughput prediction information identifies a corresponding future time period (e.g., 15 s from time X). In some variations, in an open-loop guidance mode, each future throughput prediction information identifies a predicted link throughput change for the application communication relative to a previous time period, and a throughput quality description of a predicted quality of link throughput for the application communication. In some variations, in a closed-loop guidance mode, each future throughput prediction information identifies a predicted average application throughput for the application communication, and a predicted worst-case application throughput for the application communication.

In some variations, S246 includes one or more of: predicting future link latency quality S247; predicting future link latency change S248; predicting future average application latency S249; and predicting future worst case application latency S299. In some variations, in an open-loop guidance mode, S246 includes S247 and S248. In some variations, in a closed-loop guidance mode, S247 includes S249 and S299.

In some variations, each future latency prediction information identifies a corresponding future time period (e.g., 15 s from time X). In some variations, in an open-loop guidance mode, each future latency prediction information identifies a predicted link latency change for the application communication relative to a previous time period, and a latency quality description of a predicted quality of link latency for the application communication. In some variations, in a closed-loop guidance mode, each future latency prediction information identifies a predicted average application latency for the application communication, and a predicted worst-case application latency for the application communication.

S250 includes providing prediction information. In some variations, S250 includes providing prediction information generated at S240 to the associated application server (e.g., 111). In some variations, S250 includes providing prediction information generated at S240 to the associated application client (e.g., 198). In some variations, S250 includes providing prediction information generated for a plurality of future time periods at S240 to the associated application server (e.g., 111). In some variations, S250 includes providing prediction information generated for a plurality of future time periods at S240 to the associated application server (e.g., 111) in a single transmission. In some variations, S250 includes providing prediction information generated for a plurality of future time periods at S240 to the associated application server (e.g., 111) in a plurality of transmissions. In some variations, S250 includes providing prediction information for at least one future time period that corresponds to a next transmission of application content from the application server to the user device via the mobile network.

In some variations, S250 includes providing prediction information predictions in real time or substantially real time.

In some variations, S260 functions to determine application parameters. In some implementations, the application client (e.g., 198) (executed by the user device, e.g., 103) performs S260. In some implementations, the application client provides the determined application parameters to the application (e.g., 110). In some implementations, the application (e.g., 110) (executed by the application server, e.g., 111) performs S260. In some implementations, the application client (e.g., 198) operates in accordance with at least one determined application parameter. In some implementations, the application (e.g., 110) operates in accordance with at least one determined application parameter.

In some variations, the application parameters are determined based on the prediction information (e.g., provided by the guidance service system 105).

In some variations, application parameters include at least one of data encryption parameters, data decryption parameters, data encoding parameters, data decoding parameters, data transmission parameters, data reception parameters, control parameters, application server data processing parameters, and application client data processing parameters.

In some variations, application parameters for video streaming applications include bandwidth parameters, including parameters for at least one of: bitrate, bitrate ladder, buffers, and the like.

In some variations, application parameters for music/audio streaming applications include bandwidth parameters, including parameters for at least one of: bitrate, bitrate ladder, buffers, and the like.

In some variations, application parameters for a AR (Augmented Reality)/VR (Virtual Reality) streaming applications include bandwidth parameters, including parameters for at least one of: bitrate, bitrate ladder, buffers, and the like.

In some variations, application parameters for videoconferencing applications include bandwidth parameters and latency parameters, including parameters for at least one of: bitrate, frame rate, resolution, sending bandwidth, and the like.

In some variations, application parameters for online gaming applications include bandwidth parameters and latency parameters, including parameters for at least one of: bitrate, frame rate, resolution, sending bandwidth, and the like.

In some variations, application parameters for online collaboration applications include bandwidth and latency parameters, including parameters for at least one of: bitrate, frame rate, resolution, sending bandwidth, and the like.

In some variations, application parameters for sensor data upload applications include bandwidth parameters (and, optionally, latency parameters), including parameters for at least one of: bitrate, resolution, compression factor, upload time, and the like.

In some variations, application parameters for cloud inference applications include bandwidth parameters (and, optionally, latency parameters), including parameters for at least one of: compression factor, sending bandwidth, and the like.

In some variations, application parameters for tele-operation applications include bandwidth and latency parameters, including parameters for at least one of: bitrate, frame rate, resolution, sending bandwidth, and the like.

In some variations, application parameters for platooning applications include latency parameters, including parameters for at least one of: inter-vehicle distance, and the like.

In some variations, application parameters for cooperative maneuver applications include latency parameters, including parameters for at least one of: signaling frequency, signaling size, and the like.

In some variations, application parameters for collaborative sensing applications include bandwidth and latency parameters, including parameters for at least one of: signaling frequency, signaling size, and the like.

In some variations, S260 includes S261, which functions to determine a bit rate for application content transmission.

In some implementations, the application client (e.g., 198) (executed by the user device, e.g., 103) performs S261. In some implementations, the application client provides the determined bit rate to the application (e.g., 110). In some implementations, the application (e.g., 110) (executed by the application server, e.g., 111) performs S261

In some implementations, the ABR module (e.g., 113) of the application performs S261. In some implementations, S261 includes: accessing throughput prediction information (received from the guidance service system) for the user device that corresponds to the next transmission of application content (e.g., 112), and determining a bit rate for the next transmission, based on the throughput quality description identified by the accessed throughput prediction information. In some implementations, S261 includes: accessing throughput prediction information (received from the guidance service system) for the user device that corresponds to the next transmission of application content (e.g., 112), and determining a bit rate for the next transmission, based on the average application throughput identified by the accessed throughput prediction information.

In some implementations, S261 includes: accessing latency prediction information (received from the guidance service system) for the user device that corresponds to the next transmission of application content (e.g., 112), and determining a bit rate for the next transmission, based on the latency quality description identified by the accessed latency prediction information. In some implementations, S261 includes: accessing latency prediction information (received from the guidance service system) for the user device that corresponds to the next transmission of application content (e.g., 112), and determining a bit rate for the next transmission, based on the average application latency identified by the accessed latency prediction information.

In some implementations, S261 includes: transmitting the application content to the user device via the mobile network in accordance with the determined bit rate. In some implementations, S261 includes: transmitting the application content to the user device via the mobile network in accordance with the determined bit rate and buffer parameters selected at S261.

In some variations, S260 includes S262, which functions to determine buffer parameters for application content transmission.

In some implementations, determined buffer parameters include at least one of: maximum buffer size, minimum buffer for playback, and minimum buffer after rebuffer. In some implementations, determined buffer parameters can include any suitable buffer parameters.

In some implementations, the application client (e.g., 198) (executed by the user device, e.g., 103) performs S262. In some implementations, the application client provides the selected buffer parameters to the application (e.g., 110).

In some implementations, the application (e.g., 110) (executed by the application server, e.g., in) performs S262. In some implementations, the buffer size selection module (e.g., 114) of the application performs S262. In some implementations, S262 includes: accessing throughput prediction information (received from the guidance service system) for the user device that corresponds to the next transmission of application content (e.g., 112), and selecting buffer parameters, based on the link throughput change identified by the accessed throughput prediction information. In some implementations, S262 includes: accessing throughput prediction information (received from the guidance service system) for the user device that corresponds to the next transmission of application content (e.g., 112), and selecting buffer parameters based on the worst-case application throughput identified by the accessed throughput prediction information.

In some implementations, S262 includes: accessing latency prediction information (received from the guidance service system) for the user device that corresponds to the next transmission of application content (e.g., 112), and selecting buffer parameters, based on the link latency change identified by the accessed latency prediction information. In some implementations, S262 includes: accessing latency prediction information (received from the guidance service system) for the user device that corresponds to the next transmission of application content (e.g., 112), and selecting buffer parameters based on the worst-case application latency identified by the accessed throughput prediction information.

In some implementations, S262 includes: transmitting the application content to the user device via the mobile network in accordance with the selected buffer parameters. In some implementations, S262 includes: transmitting the application content to the user device via the mobile network in accordance with the selected buffer parameters and a bit rate determined at S261.

S270 functions to receive feedback. In some implementations, the guidance service system (e.g., 105) receives the feedback. In some implementations, the feedback module (e.g., 180) receives the feedback. S270 can include at least one of receiving throughput feedback S271, receiving latency feedback S273, and receiving application feedback S272. In some implementations, the application server (e.g., 111) provides the feedback to the guidance service system (e.g., 105). In some implementations, S270 includes the guidance service system receiving per-user feedback from the application over one or more recently-concluded application content transmissions (from the application to the user device via the mobile network), as described herein. In some variations, received feedback corresponds to prediction information provided to the application (e.g., 111) by the guidance service system (e.g., 105) for at least one future time period (of which some time periods correspond to transmission of application content from the application to a user device via the mobile network). In some implementations, the application provides the feedback periodically (e.g., every 5 seconds, etc.). In some implementations, the application provides the feedback at the end of every transmission of application content to a user device via the mobile network.

In some variations, the method 200 can optionally include: at the application server (e.g., 111), receiving a throughput and/or latency prediction (e.g., average for an epoch, time series for each of a set of timestamps) for the user or user device (e.g., in response to requesting the information from the guidance service system) and determining a bitrate level (and/or content quality, e.g., quality) to use based on throughput and/or latency prediction. The method 200 can optionally include: at the application (e.g., executing on a receiving user device) or an application server (e.g., 111), receiving a worst case throughput and/or latency prediction (e.g., for the next N content segments, for a given epoch, etc.) for the user or user device (e.g., in response to requesting the information from the guidance service system) and determining a maximum buffer level to use based on the worst case throughput and/or latency prediction. The method 200 can optionally include dynamically adjusting the bitrate level (e.g., based on the actual available throughput and/or latency, based on the buffer level), dynamically adjusting the maximum buffer level, or otherwise adjusting the traffic downloads. The method 200 can optionally include transmitting the selected bitrate level, buffer level, ABR algorithm parameter or weight, and/or any other suitable information back to the guidance service system.

S280 functions to update generation of predictions based on received feedback. In some implementations, the guidance service system (e.g., 105) performs S280. In some implementations, the feedback module (e.g., 180) performs S280. In some implementations, the machine learning system (e.g., 209) performs S280.

In some variations, S280 includes automatically updating the prediction engine (e.g., 160) based at least one of received throughput feedback information, latency feedback information, and application feedback information (received at S270). In some variations, updating the prediction engine includes: tuning the prediction engine. In some variations, updating the prediction engine includes: updating a tuning parameter of the prediction engine that changes prediction generation by the prediction engine (as described herein). In some variations, updating the prediction engine includes: adding (or updating) an output transformation used by the prediction engine to transform predictions (as described herein). In some implementations, S280 includes automatically updating a tuning parameter of the prediction engine based on a comparison between throughput feedback information (received at S271) and the corresponding predicted average application throughput. In some implementations, S280 includes automatically updating a tuning parameter of the prediction engine based on a comparison between latency feedback information (received at S273) and the corresponding predicted average application latency.

In an example flow of a system in accordance with one or more variations of the present application, an active user uses a mobile phone (e.g., 103) to execute the application (e.g., 110). To do so, the user connects the mobile phone to mobile network (e.g., 102) which is operated by the user's mobile phone carrier. Mobile network provides telemetry data to the guidance service system (e.g., 105) which is hosted on a mobile cloud belonging to the mobile phone carrier. The guidance service system detects that active user is actively using the application (e.g., 110) (e.g, an Over-the-Top application), and sends user throughput predictions for the user to the application (via the Internet and an application server, e.g., 111). The application server is a server which the application communicates with, and which is owned by the operator or developer of the application. Using the user throughput predictions, the application automatically adjusts some aspect (e.g., bitrate, maximum buffer size) for streaming media content to be optimized based on active user's user throughput predictions, which are a few seconds ahead of the streaming content, and which allow the application to adjust the streaming to account for user throughput dips and/or latency spikes. In some variations, the guidance service system also sends information about the latency of the mobile network through the same route to the application. Both the user throughput prediction and the latency prediction can be sent via a guidance service system API (e.g., a REST API), specifically through an open-loop guidance mode of the guidance service API. In some variations, the application may call an API function to request the information, and the information is returned to the application accordingly.

In variants, in return, the application sends information back to the guidance service system via the application server and the Internet. Using a closed-loop guidance mode of the guidance service system API, the application can pass in information (e.g., feedback) through API calls. In some variations, the information sent by the application includes per-user throughput and/or latency feedback over one or more recently-concluded application content downloads. Using an application-aware closed-loop guidance mode of the guidance service API, the application can similarly send information about application settings and/or configurations used by the application in terms of, e.g., streaming content ABR algorithms, maximum buffer size, etc. The guidance service system can use one or more pieces of received information to adjust aspects of the guidance service system to improve the QoE of the active user.

Methods disclosed herein can be embodied and/or implemented at least in part by a machine constructed to execute machine-executable instructions stored on at least one non-transitory computer-readable storage medium. The instructions are preferably executed by at least one processing component (e.g., processor or a special-purpose processing circuit). The non-transitory computer-readable storage medium can include any suitable computer-readable media such as RAMs, ROMs, flash memory, EEPROMs, optical devices (CD or DVD), hard drives, floppy drives, and the like. The at least one processing component is preferably a general or application specific processor, but any suitable dedicated hardware or hardware/firmware combination device can alternatively or additionally execute the instructions.

As a person skilled in the art will recognize from the previous detailed description and from the figures and claims, modifications and changes can be made to the preferred variations of the invention without departing from the scope of this invention defined in the following claims.

What is claimed is:

1. A method comprising:
   for application communication between a user device and an application server via a mobile network, generating throughput prediction information for each of a plurality of future time periods, each throughput prediction information identifying:
      the future time period of the plurality of future time periods,
      a predicted link throughput quality for the application communication for the future time period, and
      a predicted link throughput change for the application communication for the future time period relative to a previous time period, and
   providing the generated throughput prediction information to at least one of the application server and the user device,
   wherein the throughput prediction information is generated for at least two successive future time periods.

2. The method of claim 1, wherein a guidance service system generates the throughput prediction information and provides the generated throughput prediction to at least one of the application server and the user device.

3. The method of claim 2, wherein for each future time period, generating throughput prediction information for the future time period comprises generating a qualitative throughput quality description.

4. The method of claim 2, wherein the guidance service system generates each throughput prediction information by using telemetry data of the mobile network, and provides each throughput prediction information via the Internet.

5. The method of claim 4, wherein the guidance service system generates at least one throughput prediction information responsive to detection of at least one change affecting network throughput of the mobile network.

6. The method of claim 5, wherein at least one of the future time periods corresponds to a next transmission of application content from the application server to the user device via the mobile network.

7. The method of claim 6, wherein the application server:
   accesses the throughput prediction information for the user device that corresponds to the next transmission of application content, and wherein the application content is video data,
   determines a bit rate for the next transmission, based on the throughput quality description identified by the accessed throughput prediction information,
   selects at least one buffer parameter, based on the link throughput change identified by the accessed throughput prediction information, and
   transmits the video data to the user device via the mobile network in accordance with the determined bit rate and at least one selected buffer parameter.

8. The method of claim 1, wherein providing the generated throughput prediction information comprises: providing the generated throughput prediction information for a plurality of future time periods in a single transmission.

9. The method of claim 1, further comprising:
   for the application communication between the user device and the application server, generating latency prediction information for each of the plurality of future time periods, each latency prediction information identifying:
      the future time period,
      a predicted link latency change for the application communication relative to the previous time period, and
      a latency quality description of a predicted quality of link latency for the application communication; and
   providing the generated latency prediction information to at least one of the application server and the user device.

10. A method comprising:
    for application communication between a user device and an application server via a mobile network, generating throughput prediction information for each of a plurality of future time periods, each throughput prediction information identifying:
       the future time period of the plurality of future time periods,
       a predicted link throughput quality for the application communication for the future time period,
       a predicted average application throughput for the application communication for a period including the future time period;
       and
    providing the generated throughput prediction information to at least one of the application server and a user device,
    wherein the throughput prediction information is generated for at least two successive future time periods.

11. The method of claim 10, wherein for each future time period, generating throughput prediction information for the future time period comprises generating a predicted worst-case application throughput.

12. The method of claim 11, wherein the application server:
    accesses throughput prediction information for the user device that corresponds to a next transmission of application content, and wherein the application content is video data,
    determines a bit rate for the next transmission, based on the average application throughput identified by the accessed throughput prediction information,
    selects at least one buffer parameter, based on the worst-case application throughput identified by the accessed throughput prediction information, and
    transmits the video data to the user device via the mobile network in accordance with the determined bit rate and at least one selected buffer parameter.

13. The method of claim 10, further comprising: receiving, from at least one of the application server and the user device, throughput feedback information identifying measured application throughput for a corresponding predicted average application throughput.

14. The method of claim 13, further comprising: automatically updating a prediction engine used to predict the average application throughput, based on the throughput feedback information.

15. The method of claim 13, further comprising:
automatically tuning the prediction engine based on a comparison between the received throughput feedback information and the corresponding predicted average application throughput.

16. The method of claim 13, further comprising:
receiving, from at least one of the application server and the user device, application feedback information for a corresponding predicted average application throughput, wherein the application feedback information identifies at least one of: a selected bit rate, a selected maximum buffer size, video QoE (Quality of Experience) information, and traffic efficiency information.

17. The method of claim 16, further comprising: automatically updating the prediction engine based on the application feedback information.

18. The method of claim 17, wherein automatically updating the prediction engine based on the application feedback information comprises: updating an output transformation of the prediction engine based on the application feedback information.

19. The method of claim 10, further comprising:
for the application communication between the user device and the application server, generating latency prediction information for each of the plurality of future time periods, each latency prediction information identifying:
the future time period,
a predicted average application latency for the application communication, and
a predicted worst-case application latency for the application communication; and
providing the generated latency prediction information to at least one of the application server and the user device.

20. A system comprising:
a guidance service system;
a mobile network communicatively coupled to the guidance service system; and
an application server communicatively coupled to the guidance service system via the Internet, and constructed to provide application content to a user device via the mobile network,
wherein the guidance service system is constructed to generate throughput prediction information for each of a plurality of future time periods, each throughput prediction information identifying:
the future time period of the plurality of future time periods,
a predicted link throughput quality for the application communication for the future time period,
a predicted average application throughput for the application communication for a period including the future time period; and
wherein the guidance service system is constructed to provide the generated throughput prediction information to at least one of the application server and the user device,
wherein the throughput prediction information is generated for at least two successive future time periods, and
wherein the application server is constructed to transmit video data to the user device via the mobile network in accordance with a bit rate and buffer parameters selected based on throughput prediction information received from the guidance service system.

* * * * *